United States Patent [19]  [11] 3,983,049
Aftergut et al.  [45] Sept. 28, 1976

[54] LIQUID CRYSTAL COMPOSITIONS WITH POSITIVE DIELECTRIC ANISOTROPY

[75] Inventors: Siegfried Aftergut, Schenectady; Herbert S. Cole, Jr., Scotia, both of N.Y.

[73] Assignee: General Electric Company, Schenectady, N.Y.

[22] Filed: May 2, 1974

[21] Appl. No.: 466,384

[52] U.S. Cl. .............................. 252/299; 350/150; 350/160 LC
[51] Int. Cl.² ...................... C09K 3/34; G02F 1/13
[58] Field of Search ............... 252/408 LC, 299; 350/160 LC, 150

[56] References Cited
UNITED STATES PATENTS

| | | | |
|---|---|---|---|
| 3,792,915 | 2/1974 | Oh et al. | 252/408 LC |
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/408 LC |
| 3,853,785 | 12/1974 | Labes | 252/408 LC |
| 3,881,806 | 5/1975 | Suzuki | 252/299 |

FOREIGN PATENTS OR APPLICATIONS

| | | | |
|---|---|---|---|
| 2,024,269 | 12/1971 | Germany | 252/299 |
| 2,327,036 | 12/1973 | Germany | 252/299 |
| 2,321,632 | 11/1974 | Germany | 252/299 |
| 49-130882 | 12/1974 | Japan | 252/299 |
| 48-92284 | 11/1973 | Japan | 252/299 |

OTHER PUBLICATIONS
Castellano, Joseph A., et al., J. Org. Chem., vol. 33, No. 9, pp. 3501–3504 (Sept. 1968).
Usol'tseva, V. A. et al., Russ. Chem. Rev., vol. 32, No. 9, pp. 495–507 (Sept. 1963).
Schadt, M., J. Chem. Phys., vol. 56, No. 4, pp. 1494–1497 (Feb. 1972).
Dave, J. S. et al., Molecular Crystals, vol. 2, pp. 125–134 (1966).
Dave, J. S. et al., Indian J. Chem., vol. 7, pp. 498–500 (1969).
Dave, J. S. et al., Indian J. Chem., vol. 4, pp. 386–390 (1966).
Dave, J. S. et al., J. Chem. Soc.(A), pp. 1473–1478 (1967).
Dave, J. S. et al., J. Chem. Soc., Part 4, pp. 4305–4309 (1955).
Dave, J. S. et al., J. Chem. Soc., Part 4, pp. 4616–4621 (1954).

*Primary Examiner*—Benjamin R. Padgett
*Assistant Examiner*—T.S. Gron
*Attorney, Agent, or Firm*—Geoffrey H. Krauss; Joseph T. Cohen; Jerome C. Squillaro

[57] ABSTRACT

Non-liquid crystal additives to negative dielectric anisotropy liquid crystals produce a positive dielectric anisotropy. Criteria for empirically determining suitable additives are disclosed. The general structure of suitable compounds is:

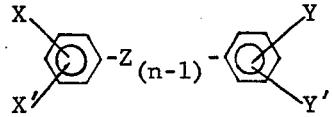

wherein Z is a divalent radical, n is an integer having a value of 1 to 2; X, X', Y, Y' occupy only meta- and para-positions; X and X' are either electron withdrawing polar groups or hydrogen; Y and Y' are either electron repelling polar groups or hydrogen; at least one of X, X', Y and Y' is a polar group and, when only one of X, X', Y and Y' is a polar group, it occupies the para-position.

9 Claims, No Drawings

LIQUID CRYSTAL COMPOSITIONS WITH POSITIVE DIELECTRIC ANISOTROPY

This invention relates to liquid crystal devices and, in particular, to non-liquid crystal additives for liquid crystal materials.

As used herein, "liquid crystal" refers to that class of materials exhibiting a mesophase over a measurable temperature range, wherein the mesophase lies between the solid or crystalline phase and the liquid phase, and the material exhibits some characteristics of both phases.

Nematic liquid crystals in the mesophase are anisotropic, i.e., their physical properties, such as dielectric constant, refractive index, viscosity, depend upon the direction in which they are measured.

Nematic liquid crystals of either positive or negative dielectric anisotropy are known, although negative materials are much more numerous than positive materials. If the dielectric constant in the direction approximately parallel to the long molecular axis ($\epsilon_{\parallel}$) is larger than that perpendicular to this direction ($\epsilon_{\perp}$), the dielectric anisotropy ($\Delta\epsilon$) is defined as positive. Negative dielectric anisotropy is the converse situation.

Positive and negative nematic liquid crystal materials are useful for different applications by virtue of their different electro-optical effects. For example, negative materials exhibit what is known as dynamic scattering, producing a milky or cloudy appearance. The molecules of positive materials can be oriented in an electric field and can be used in what are referred to as field-effect devices. In such devices, the liquid crystal is used in conjunction with polarizers. Depending on the arrangement of the polarizers with respect to the liquid crystal layer, the device can be made to transmit or absorb light in the presence of an electric field. In addition, the liquid crystal molecules can be arranged to undergo a 90° twist within a given liquid crystal layer. When such layer is sandwiched between crossed polarizers, light is transmitted in the absence of an electric or magnetic field. Application of a field causes the light to be absorbed.

Most of the presently known single-component liquid crystals of positive dielectric anisotropy have high melting points and are not suitable for applications at room temperature. Two methods have been employed for deriving room temperature materials. One method utilizes mixtures made from solid nematics of positive dielectric anisotropy, which mutually depress their melting points to the room temperature range. Another method converts a negative liquid crystal to a positive mixture by the addition of solid nematic liquid crystal materials of positive dielectric anisotropy to room temperature nematics of negative dielectric anisotropy.

Both of the above methods for deriving room temperature positive materials have certain disadvantages. A difficulty with the first is that there are relatively few positive materials whose mixtures have a mesophase which includes room temperature. A disadvantage of the second method is that the availability of relatively few positive liquid crystals imposes limits on the preparation of positive materials. Thus, some positive liquid crystals when added to negative liquid crystals result in mixtures of undesirable properties such as increased viscosity and higher freezing point which, for example, may result in a slower relaxation time. Having a plurality of additives available is desirable so that the dielectric anisotropy of the mixture can be tailored to the signal voltages available.

In view of the foregoing, it is therefore an object of the present invention to provide a new class of additive materials for nematic liquid crystals having negative dielectric anisotropy.

Another object of the present invention is to provide a new class of additives for namatic liquid crystal materials having negative dielectric anisotropy, wherein the resulting positive dielectric anisotropy is attainable with a smaller concentration of additive.

A further object of the present invention is to provide a new class of materials for use as an additive to nematic liquid crystals having negative dielectric anisotropy for producing a net positive dielectric anisotropy with 15 percent or less additive.

Another object of the present invention is to provide a new class of materials for use as an additive to nematic liquid crystals having negative dielectric anisotropy wherein the additive itself is not a liquid crystal.

The foregoing objects are achieved in the present invention wherein room temperature liquid crystals of positive dielectric anisotropy are prepared from liquid crystals of negative dielectric anisotropy by adding certain compounds which are not liquid crystals themselves, as defined above (and thus do not exhibit a mesophase at any measurable temperature range), and which meet additional criteria. In general, the additive comprises a molecule having a formula:

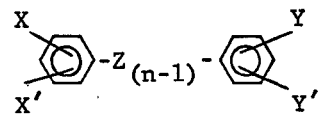

In the above, Z is a divalent radical and $n$ is an integer having a value of 1 to 2. For $n$ equals 1, there is a direct bond between the benzene rings. For $n$ equals 2, the radical may comprise Schiff base (CH:N), ether (O) or an ester ($CO_2$). X, X', Y and Y' occupy only the meta- and para-positions. X and X' are each either hydrogen or an electron withdrawing polar group, such as nitrile (CN), nitro ($NO_2$), carboxyl ($CO_2H$), or chloro (Cl). Y and Y' are each either hydrogen or an electron repelling polar group, such as alkyl (R), alkylamino (RNH), dialkylamino ($R_2N$) and alkoxy (OR), each having up to 12 carbon atoms, alkoxy (OH), or amino ($NH_2$). When Z is asymmetrical, X, X' and Y, Y' can be interchanged. At least one of X, X', Y, Y' is a polar group and, when only one of X, X', Y, Y' is a polar group, it occupies the paraposition.

A more complete understanding of the present invention can be obtained by considering the following detailed description wherein a plurality of examples of the present invention are disclosed.

As previously noted, the additives of the present invention may be generally characterized as non-liquid crystals. In addition, the molecule of the additive should be generally similar, in shape, to the liquid crystal, be polar, and have a dipole moment in a direction generally parallel to the long axis of the molecule. A fourth criterion, implicit to those of skill in the art, is that the additive must be soluble up to an effective concentration, i.e., sufficient to produce a positive dielectric anisotropy in a negative dielectric anisotropy liquid crystal material or composition in the mesophase.

The first criterion, general physical similarity, assures that the additive molecule will provide a compatible fit between the liquid crystal molecules. The additives of the present invention are characterized as aromatic, having a generally elongated molecular shape; i.e., purely acyclic or straight carbon chain additives are excluded.

The second criterion noted above is that the molecules of the additive be polar, i.e., have at least one polar end group. The molecule may comprise a single polar end group, either electron withdrawing or repelling, or the molecule may comprise a polar group at each end, one electron withdrawing and the other electron repelling. A modification of this is to utilize similar polar radicals at the same end of the molecule.

The third criterion noted above is, in a sense, a combination of the first two, viz., the molecule must exhibit a dipole moment that is approximately parallel to the long axis of the molecule. The behavior of a molecule in an electric field depends upon the existence of a permanent or induced dipole moment. In general, the dipole moment of a molecule is the vector sum of the moments of individual bonds. For example, the CH:N group in MBBA (a well-known liquid crystal) has an electron distribution which contributes to a dipole moment acting at an angle with respect to the long axis of the molecule. A highly polar end group, e.g., nitrile (CN), at a terminal position contributes to a dipole moment along the molecular axis. In a liquid crystal having this end group, such as PEBAB, N-(p-ethoxybenzylidene)-p-aminobenzonitrile, $\epsilon_\parallel$ is greater than $\epsilon_\perp$, and the dielectric anisotropy is therefore positive, by definition.

The length of the molecule does not appear to be critical although, as more fully described in conjunction with the specific examples, it is preferred that the length of the molecule of the additive approximate that of the liquid crystal.

The combination of characteristics enumerated above serve to delineate a new group of additives for negative dielectric anisotropy liquid crystals which, in low concentrations, i.e., below 15 percent by weight, produce a positive dielectric anisotropy in the composition, thereby substantially expanding the number of field effect compounds available to the art. While the enumerated characteristics enable one to empirically determine suitable additives for a liquid crystal, specific examples of suitable additives are given in Table I below. In addition, some unsuitable examples are included to demonstrate the validity of the criteria set forth above.

For the sake of reference or comparison, the following is the chemical name and formula for MBBA ($\Delta\epsilon = -0.7$):

N-(p-methoxybenzylidene)-p-(n-butyl)aniline

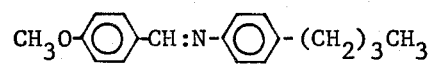

It is understood that MBBA is not the only liquid crystal with which the present invention may be utilized. It is used herein by way of example since it is widely known. Other suitable negative dielectric anisotropy liquid crystals include commercially available formulations such as marketed by Eastman Organic Chemicals under Catalog No. 11643, Merck Co. product designated as Licrystal Phase 4, and the like.

A positive dielectric anisotropy liquid crystal utilized in the prior art as an additive to MBBA to produce a positive composition in PEBAB. Specifically, N-(p-ethoxybenzylidene)-p-aminobenzonitrile

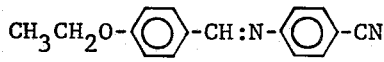

having a mesophase range of 105°–127°C and $\Delta\epsilon = 14$.

The following table lists a number of materials used as additives. Except for those materials preceded by ratio additive). an asterisk, the material was combined with MBBA in 1:19 ratio (5% of material in 95% MBBA). The two compounds preceded by an asterisk are in a 1:4 ratio (20% additive).

TABLE I

| No. | Name and Formula | Melting Point (°C) | Δε of Mixture |
|---|---|---|---|
| 1 | N-[p-(n-Octyloxy)benzylidene]-p-nitroaniline<br>$CH_3(CH_2)_7O-\text{⟨O⟩}-CH:N-\text{⟨O⟩}-NO_2$ | 75 | Positive |
| 2 | N-(p-Dimethylaminobenzylidene)-p-nitroaniline<br>$(CH_3)_2N-\text{⟨O⟩}-CH:N-\text{⟨O⟩}-NO_2$ | 200 | Positive |
| 3 | N-(p-Methylbenzylidene)-p-nitroaniline<br>$CH_3-\text{⟨O⟩}-CH:N-\text{⟨O⟩}-NO_2$ | 138 | Positive |
| 4 | p-(N,N-Dimethylaminobenzylidene)-aniline<br>$(CH_3)_2N-\text{⟨O⟩}-CH:N-\text{⟨O⟩}$ | 64 | Positive |
| 5 | N-(p-Methoxybenzylidene)-3,5-dinitroaniline<br>$CH_3O-\text{⟨O⟩}-CH:N-\text{⟨O⟩}(NO_2)_2$ | 141 | Positive |

TABLE I-continued

| No. | Name and Formula | Melting Point (°C) | Δε of Mixture |
|---|---|---|---|
| 6 | N-[p-(n-Decyloxy)benzylidene]-3,5-dinitroaniline<br>CH₃(CH₂)₉O-⟨O⟩-CH:N-⟨O⟩(NO₂)(NO₂) | 90 | Positive |
| 7 | p-Nitrophenyl phenyl ether<br>⟨O⟩-O-⟨O⟩-NO₂ | 55 | Positive |
| 8 | m-Nitrophenyl phenyl ether<br>⟨O⟩-O-⟨O⟩(NO₂) | Liq. | Negative |
| 9 | p-Nitroacetophenone<br>CH₃CO-⟨O⟩-NO₂ | 79 | Negative |
| 10 | p-Nitrobenzophenone<br>⟨O⟩-CO-⟨O⟩-NO₂ | 138 | Negative |
| 11 | p-Cyanodiphenyl<br>⟨O⟩-⟨O⟩-CN | 85 | Positive |
| 12 | p-Cyanophenyl p-methylbenzoate<br>CH₃-⟨O⟩-CO₂-⟨O⟩-CN | 140 | Positive |
| 13 | N-(p-Dimethylaminobenzylidene)-p-aminobenzonitrile<br>(CH₃)₂N-⟨O⟩-CH:N-⟨O⟩-CN | 170 | Positive |
| 14 | N-(p-Diethylaminobenzylidene)-p-aminobenzonitrile<br>(CH₃CH₂)₂N-⟨O⟩-CH:N-⟨O⟩-CN | 140 | Positive |
| 15 | N-(o-Hydroxybenzylidene)-p-aminobenzonitrile<br>⟨O⟩(OH)-CH:N-⟨O⟩-CN | 115 | Positive |
| 16 | N-(p-Ethylbenzylidene)-p-cyanomethylaniline<br>CH₃CH₂-⟨O⟩-CH:N-⟨O⟩-CH₂CN | 64 | Negative |
| *17 | N-[p-(n-Hexylbenzylidene)-p-cyanomethylaniline<br>CH₃(CH₂)₅-⟨O⟩-CN:N-⟨O⟩-CH₂CN | 50 | Positive (20% concn.) |
| *18 | N-[p-(n-Butoxybenzylidene)-p-cyanomethylaniline<br>CH₃(CH₂)₃O-⟨O⟩-CH:N-⟨O⟩-CH₂CN | 60 | Positive (20% concn.) |

The compounds listed in Table I have sharp melting points, i.e., they do not have a mesophase, and are therefore not classifiable as liquid crystals. In addition, compounds 8–10 and 16–18 do not produce a positive dielectric anisotropy at a concentration of 5 percent. Compounds 17 and 18, however, were found to produce a positive dielectric anisotropy at a concentration of 20 percent.

Compound 1 is an example of an additive having a nitro as one terminal group. This additive produces a positive dielectric anisotropy by the action of the electron withdrawing nitro group. Thus, the present invention contemplates a single polar group attached at the paraposition.

As can be seen from Example 8, a single polar group at the meta-position does not produce a sufficient dipole moment approximately parallel to the molecular axis to produce a positive dielectric anisotropy in the host liquid crystal material when used at a concentration of 5 percent. This is believed due to the fact that the nitro group in the meta-position contributes to the orthogonal component of the dipole moment vector. Compound 7, which is otherwise identical to compound 8, but has the nitro group at the para-position, produces a positive dielectric anisotropy at a 5 percent concentration because the polar group in the para-position contributes to the parallel component of the dipole moment vector.

As can be seen from the examples considered thus far, non-liquid crystal additives produce a positive dielectric anisotropy in a negative liquid crystal material provided that they are polar and have a dipole moment in a direction generally parallel to the axis of the molecule.

Compound 2 contains a dialkyl-amino group as one terminal group, Schiff base central linkage and a nitro group as the other terminal group. This compound produced a positive dielectric anisotropy in a negative liquid crystal material as did compounds 13 and 14 which are somewhat similar, in that all of these compounds contain an electron repelling group at one terminal position and an electron withdrawing group at the other.

Compounds 5 and 6 each illustrate the use of a pair of electron withdrawing radicals, nitro, in metaposition with respect to the central linkage. Polar groups at the meta-positions produce dipole moments having vector components parallel to the molecular axis and orthogonal to the molecular axis; however, the vector components orthogonal to the molecular axis tend to cancel each other out, thus producing a net dipole moment approximately parallel to the molecular axis.

Compound 9 did not produce a positive dielectric anisotropy in MBBA due to the relative difference in molecular shape.

Compound 10, although similar to Compound 7, was ineffective. This is believed due to the dipole moment of the carbonyl (CO) group in Compound 10 being orthogonal to the long axis of the compound and thus reducing the dipole moment parallel to the long molecular axis.

Compound 11 contains a single polar end group and a direct bond between the benzene rings and produces a positive dielectric anisotropy at 5 percent concentration in MBBA.

Compound 12 is an example of a compound having a central linkage formed by an ester group and producing a positive dielectric anisotropy.

Compound 13 and 14 are discussed in connection with Compound 2. Compound 15 is an example of a compound having an electron withdrawing group at one terminal position and an electron repelling group at the orthoposition of the other ring of the molecule. This compound is a member of the class of compounds in accordance with the present invention by virtue of the electron withdrawing group, not the electron repelling group.

Compounds 16–18 did not produce positive dielectric anisotropy in the mixture at the 5 percent concentration. Compounds 17 and 18 were increased to 20 percent concentration, producing a positive dielectric anisotropy. The ineffectiveness of these compounds at low concentration is believed due to the fact that the polar end groups are insulated from the benzene ring by a $CH_2$ group. A $CH_2$ group serves to insulate the effect of a polar end group from the benzene rings, thereby reducing the effect of a dipole moment approximately parallel to the axis of the molecule. The effect of the polar end group is therefore not as efficiently transmitted over the entire molecule.

The dipole moments of the additives in Table I are not known. Other factors being equal, it is believed that the effectiveness of a given group is a function of the group dipole moment. The group dipole moments of nitrile and nitro with respect to benzene are −3.8 and −3.9, where the sign indicates that the groups withdraw electrons from the benzene ring. Two radicals in a terminal position, as in compounds 5 and 6, are more effective than a single one. Similarly, polar groups of different types at each end of molecule are more effective than a polar group at only one end of the molecule.

Compound 4 which utilizes an electron repelling group only was measured to have a net positive dielectric anisotropy of 0.27 when prepared as a 3 percent by weight concentration in MBBA. Correspondingly a 3 percent concentration of PEBAB in MBBA was measured to be 0.44. When an electron withdrawing group is used in conjunction with an electron repelling group, such as Compound 13, a 3 percent concentration in MBBA showed a net positive dielectric anisotropy of 1.10. Thus, a much smaller concentration of additive is effective in making positive materials.

The relative effect of p- and m- substitution is evident in Compounds 7 and 8, where the former changes the anisotropy of MBBA and the latter does not.

While the groups described in various combinations as specific examples of the present invention produce the desired change in dielectric anisotropy if the enumerated criteria are met, some groups are preferred or are more effective within the same type. For example, among the examples given for electron withdrawing groups, nitrile and nitro radicals are more strongly polar than the chloro and carboxy radicals. Thus, they are preferred.

Among the examples given for electron repelling groups, dialkylamino, alkyl, and alkoxy are preferred. As is known in the art, amino and alkylamino compounds are more reactive than dialkylamino compounds due to the ease of oxidation of the amino radical. An additive comprising these radicals has to be handled more carefully to avoid deterioration. The hydroxy radical is more weakly polar than other groups. Thus, the remaining groups are preferred since they are more stable or more strongly polar.

The compound listed in Table I are readily prepared by known synthesis procedures. Some compounds are commercially available. Compounds 7–9 and 11 were purchased from Eastman Organic Chemicals, while Compound 10 was purchased from Aldrich Chemical Company. The Schiff base compounds are synthesized, for example, from appropriate benzaldehyde and aniline derivatives. Equimolar quantities of the starting materials are heated to 80°C for ½ hour. The product is dissolved in hot isopropyl alcohol or absolute ethyl alcohol, and the solution is filtered and cooled to precipitate the product. Multiple recrystallizations to constant melting point are then carried out. Yields are typically 50–60 percent.

Compound 12 can be synthesized, for example, from 0.03 mole each of p-toluyl chloride and p-cyanophenol mixed in 300 ml. pyridine for 16 hours. The solution is evaporated to dryness on a rotary vacuum concentrator, and the residue extracted with hexane. Upon cooling to −10°C, there is obtained a 40 percent yield of product, having a melting point of 140°C.

There is thus provided by the present invention a new class of additives for negative dielectric anisotropy liquid crystal materials which, in low concentration, enable one to produce positive dielectric anisotropy materials and further, to tailor the positive dielectric anisotropy as desired. While described in conjunction with room temperature mesophase liquid crystals, the additives of the present invention can be used in the preparation of liquid crystal materials whose mesophase is above or below room temperature.

Having thus described the present invention, it will be apparent to those skilled in the art that various modifications can be made within the spirit and scope of the present invention. For example, depending upon the liquid crystal host material, three-ring additives can be utilized and, similarly, single-ring additives may be utilized, either with a polar group at each terminal position or with a single polar group connected to the benzene ring and a rigid carbon chain forming the remainder of the molecule to give it sufficient length for compatibility with the liquid crystal host. The straight carbon chain portion of the molecule should preferably comprise a number of double bonds to give the molecule sufficient rigidity and to permit transmission of the effect of a polar end group terminating the carbon chain. In addition, while described in above as having a direct bond for the central linkage, a fused-ring compound may also be utilized; although simple fused ring compounds have a very low solubility, this can be increased by the attachment of appropriate end groups to the fused rings in addition to the polar groups.

What we claim as new and desire to secure by Letters Patent of the United States is:

1. A liquid crystal composition having positive dielectric anisotropy comprising:
    a negative dielectric anisotropy liquid crystal material; and a non-liquid crystal material comprising N-[p-(n-octyloxy) benzylidene]-p-nitroaniline, said non-liquid crystal material having no mesophase at any temperature and comprising more than zero percent and less than 15% of said composition.

2. A liquid crystal composition having positive dielectric anisotropy comprising:
    a negative dielectric anisotropy liquid crystal material; and a non-liquid crystal material comprising N-(p-methoxybenzylidene)-3,5-dinitroaniline, said non-liquid crystal material having no mesophase at any temperature and comprising more than zero percent and less than 15% of said composition.

3. A liquid crystal composition having positive dielectric anisotropy comprising:
    a negative dielectric anisotropy liquid crystal material; and a non-liquid crystal material comprising N-[p-(n-decyloxy)benzylidene]-3,5-dinitroaniline, said non-liquid crystal material having no mesophase at any temperature and comprising more than zero percent and less than 15% of said composition.

4. A liquid crystal composition having positive dielectric anisotropy comprising:
    a negative dielectric anisotropy liquid crystal material; and a non-liquid crystal material comprising p-nitrophenyl phenyl ether, said non-liquid crystal material having no mesophase at any temperature and comprising more than zero percent and less than 15% of said composition.

5. A liquid crystal composition having positive dielectric anisotropy comprising:
    a negative dielectric anisotropy liquid crystal material; and a non-liquid crystal material comprising N-(p-dimethylaminobenzylidene)-p-aminobenzonitrile, said non-liquid crystal material having no mesophase at any temperature and comprising more than zero percent and less than 15% of said composition.

6. A liquid crystal composition having positive dielectric anisotropy comprising:
    a negative dielectric anisotropy liquid crystal material; and a non-liquid crystal material comprising N-(p-diethylaminobenzylidene)-p-aminobenzonitrile, said non-liquid crystal material having no mesophase at any temperature and comprising more than zero percent and less than 15% of said composition.

7. A liquid crystal composition having positive dielectric anisotropy comprising:
    a negative dielectric anisotropy liquid crystal material; and
    a non-liquid crystal aromatic material, having no mesophase at any temperature, comprising more than zero percent and less than 15% of said composition, having a general formula:

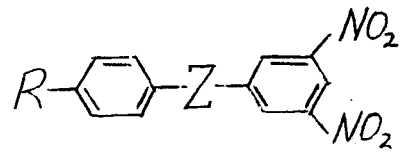

where substituent R is selected from the group consisting of alkyl, dialkylamino, alkyloxy and hydrogen; and Z is selected from the group consisting of Schiff Base, ether, ester and direct bonds.

8. The liquid crystal composition as set forth in claim 7 wherein said non-liquid crystal material comprises 5 percent of less of said composition.

9. A liquid crystal composition having positive dielectric anisotropy comprising:
    a negative dielectric anisotropy liquid crystal material: and
    a non-liquid crystal material selected from the group consisting of
    N-[p-dimethylaminobenzylidene)-p-nitroaniline and p-(N,N-dimethylaminobenzylidene)-aniline,
    the selected non-liquid crystal material having no mesophase at any temperature and comprising more than zero percent and less than 15% of said composition.

* * * * *